United States Patent [19]

Nohara et al.

[11] 4,307,048

[45] Dec. 22, 1981

[54] METHOD FOR LINING AN ALUMINUM ELECTROLYTIC CELL

[75] Inventors: Katsutaro Nohara, Nagoya; Tatsuo Tateno, Toyo, both of Japan

[73] Assignee: Sumitomo Aluminium Smelting Company, Limited, Osaka, Japan

[21] Appl. No.: 110,610

[22] Filed: Jan. 9, 1980

[30] Foreign Application Priority Data

Jan. 17, 1979 [JP] Japan .................................. 54/4183

[51] Int. Cl.³ .............................................. F27D 1/16
[52] U.S. Cl. ..................................................... 264/30
[58] Field of Search ......................................... 264/30

[56] References Cited

U.S. PATENT DOCUMENTS

4,032,653 6/1977 Dell .................................... 204/294

*Primary Examiner*—Thomas P. Pavelko
*Attorney, Agent, or Firm*—Stevens, Davis, Miller & Mosher

[57] ABSTRACT

In lining parts to be stamped of an aluminum electrolytic cell by filling a carbonaceous stamping material into the part and stamping the filled stamping material, a mixture consisting essentially of a carbon aggregate and a binder and being capable of being stamped at a temperature above 100° C. is prepared; a solvent for the binder containing aromatic hydrocarbon as a main component in an amount insufficient to effect stamping of the stamping material at room temperature, but sufficient to stamped at a temperature of 50° to 100° C., when added to the mixture; the mixture and the solvent are mixed together, before application, to prepare a carbonaceous stamping material; and the carbonaceous stamping material is applied to the part of the cell to be stamped at a temperature of 50° to 100° C. to effect the lining of the cell, whereby the stamping environment can be greatly improved by eliminating generation of pitch fumes and hot vapors and at the same time deterioration in physical properties of the stamping material is substantially prevented.

5 Claims, No Drawings

METHOD FOR LINING AN ALUMINUM ELECTROLYTIC CELL

This invention relates to a method for lining an aluminum electrolytic cell with a special carbonaceous stamping material.

Usually, a cell body (cathode part and its vicinities) of an aluminum electrolytic cell is built by lining the inside of a steel casing with bricks, further providing carbonaceous side walls on the inside surfaces of the bricks at the sides of the cell and a plurality of calcined carbon blocks having a cathode electroconductive rod inserted through the carbon blocks on the inside surfaces of the bricks at the bottom of the cell, filling an uncalcined carbonaceous stamping material into joints between the carbon blocks, and the side lining parts (the parts surrounded by the carbon blocks, carbonaceous side walls and bricks), and stamping the uncalcined stamping material therein. The stamped uncalcined stamping material is gradually calcined, and then exposed to an electrolytic bath of molten fluoride salt at a high temperature (about 1,000° C.) and also to molten aluminum, and subjected to thermal, mechanical and electrochemical actions due to the molten fluoride salt and molten aluminum. Thus, it must be stable against these actions. Particularly, the joints between the carbon blocks are liable to be peeled off owing to stresses, for example, due to a thermal expansion or contraction of the stamped material or a diffusion of both into the stamped material and successive swelling of the stamped material, and furthermore react with the molten aluminum to form a carbide, and is considerably deteriorated. The joints are the weakest positions at the cathode part of the electrolytic cell, and the quality of the joints controls the life of the electrolytic cell.

According to another method, a cathode electroconductive rod is provided on the bricks at the bottom of the electrolytic cell, and the carbonaceous stamping material is directly stamped on the rod, but the stamped material is susceptible to the thermal, mechanical and electrochemical actions of the molten electrolytic bath and the molten aluminum in the same manner as described above.

According to another mode, the carbonaceous stamping material is used to make a partial repair of the cathode part when an electrolytic cell is lined again.

The present invention provides a carbonaceous stamping material particularly having an easy stamping operation and good characteristics even after the stamping in the lining of an aluminum electrolytic cell so far conducted in the various manners as described above, and also provides a method for lining an aluminum electrolytic cell with such a carbonaceous stamping material.

Generally, the carbonaceous stamping material must satisfy the following severe requirements. That is, the material must have (1) a small thermal expansion or contraction, (2) a large mechanical strength, and (3) a good electrochemical stability.

To satisfy these requirements, the carbonaceous stamping material has been so far prepared by mixing and kneading various carbonaceous materials such as calcined anthracite, artificial graphite, foundry coke, pitch coke, etc., as an aggregate with pitch having a softening point of about 30° to about 60° C. (according to mercury method) as a binder, and has been usually so used. The higher the softening point of the pitch as the binder, the higher the molecular weight of calcined stamped product, that is, the more improved the binding force, calcination yield (carbonization ratio), and the physical properties of the resulting stamped product. However, a higher temperature is required for obtaining a workable fluidity, generating much pitch fumes and hot vapors, and making the maintenance of the temperature difficult. Thus, in view of a balance between the applicability and physical properties, the pitch having a relatively low softening point as mentioned above is employed.

In order to obtain a good applicability and an optimum packing density in application of a stamping material, it is necessary to uniformly heat the stamping material up to a temperature of about 120° to about 160° C. and preheat carbon blocks and carbonaceous side walls by some heating means to assure a sufficient bonding of the stamping material to the carbon blocks or carbonaceous side walls. Thus, the stamping operation is usually carried out rapidly by hand in such a state that the stamping material still has an applicability on the basis of a combination with the heating and preheating, that is, before the heating temperature is not lowered by cooling. Disagreeable pitch fumes or hot vapors are generated from the heated stamping material at its application, and make the working environment much worse as such, and thus workers must wear protectors such as masks, etc. or a local ventilation facility must be provided at the stamping positions.

Attempts have been already proposed for mechanizing the stamping operation (for example, Japanese Laid-open Patent Application Specifications Nos. 36017/73, 131909/74, 50214/75, etc.). However, these attempts have not yet solved the generation of the disagreable pitch fumes from the stamping material completely, and rather require provision of complicated machines and repetitions of complicated adjustment and operation of these machines.

U.S. Pat. No. 4,032,653 discloses a stamping material (seam mix) applicable at room temperature, which is a mixture comprising a carbon aggregate and a binder, and further containing a solvent in such an amount as to undergo stamping without heating the mixture. More particularly, the U.S. Patent discloses a mixture comprising 7 to 17% by weight of a binder having a softening point of 48° to 54° C. (according to the Cube-in-air method), which corresponds to about 34° to about 40° C. according to the mercury method, a carbon aggregate in an amount in percent by weight of 100% minus the amount in percent by weight of the binder used, and 8 to 16% by weight of crude methylnaphthalene solvent on the basis of the binder (that is, 0.56 to 2.72% by weight of the total of the carbon aggregate and the binder), and one example of the U.S. Patent discloses a mixture containing 12 to 13% by weight of pitch having a softening point of about 50° to about 52° C. (according to the Cube-in-air method) as a binder and 88 to 87% by weight of calcined anthracite as an aggregate, prepared by mixing the pitch with 10 to 12% by weight of crude methylnaphthalene solvent on the basis of the pitch (which corresponds to 1.2 to 1.56% by weight on total amount of the aggregate and the binder) with heating at 75° C., and adding the resulting mixture to the aggregate at room temperature, followed by mixing. The resulting stamping material can be applied without any heating, and thus a substantial generation of pitch fumes and hot vapors can be eliminated at the stamping operation, greatly improving the working environment, as compared with the conventional stamping materials.

However, said stamping material still has the following problems:

(1) A large amount of a low molecular weight solvent is required for lowering the application temperature to room temperature.

(2) The presence of the large amount of the low molecular weight solvent can improve the fluidity of the stamping material itself, but decreases the binding force of the binder, that is, the proper object of the binder, deteriorating the mechanical strength of a stamped product and also making the stamped product porous. That is, adhesion to carbon blocks or carbonaceous side walls is deteriorated thereby.

(3) Since the application is carried out at room temperature, a sufficient solidification cannot be obtained even after the end of the application. Thus, there is a great danger of deformation or breakage particularly at side lining parts having a large application area and inclined surfaces in the course of various preparatory workings for the start-up of an electrolytic cell.

(4) When such type of stamping material is to be transported to a remote site, the stamping material is subjected to a change in climatic temperature, particularly a change in temperature at the application site, and is solidified and agglomerated at a low temperature. The agglomerated stamping material must be disintegrated. When it is exposed to a higher temperature on the other hand, it becomes too soft to obtain the optimum packing density.

An object of the present invention is to provide a carbonaceous stamping material characterized in that a stamped product itself has less deterioration in physical properties, and can be solidified into a less deformable state at an ambient temperature after the end of stamping, and generation of disagreeable pitch fumes is completely eliminated at the stamping operation.

Another object of the present invention is to provide a method for lining an aluminum electrolytic cell with such a carbonaceous stamping material as above.

As a result of studies, the present inventors have found that it is particularly effective to separately prepare a mixture capable of being stamped at a temperature over 100° C. consisting essentially of a carbonaceous aggregate and a binder, and a solvent for the binder containing an aromatic hydrocarbon as a main component separately as independent systems, and mix these two systems before stamping operation, thereby preparing a carbonaceous stamping material capable of being stamped at a temperature of 50° to 100° C.

According to the present method for lining an aluminum electrolytic cell, the carbonaceous stamping material prepared as above is filled in parts to be stamped of the aluminum electrolytic cell at a temperature of 50° to 100° C. and stamped, thereby effecting lining.

As the carbon aggregate and binder, those so far used can be used in the present invention. Preferably a mixture of a type such as to undergo stamping by heating at about 120° to about 160° C. so far used can be employed.

The carbon aggregate includes various carbon materials, for example, calcined anthracite, artificial graphite, foundry coke, pitch coke, and the binder is generally tar pitch of coal origin, but pitch of petrolium origin can also be used. The characteristic of the binder is defined principally by a softening point, and pitch having a softening point of about 30° to about 60° C. according to the mercury method is satisfactory for the present invention. A mixture of carbon aggregate with a pitch having a higher softening point, for example, about 60° to about 150° C., as the binder can be stamped at a higher temperature, for example, about 160° to about 250° C., but according to the present invention, such a high stamping temperature can be lowered to 50° to 100° C. by adding the solvent thereto, and thus the binder having such a high softening point can be employed in the present invention. A preferable percent ratio by weight of the carbon aggregate to the binder is 93-80 to 7-20 to make the total 100% by weight.

In the present invention, a solvent for the binder is further used. The solvent for the binder herein used as a solvent capable of dissolving said binder, and the binder usually belongs to the aromatic compound. Thus, to dissolve such a binder, it is necessary to use a solvent containing aromatic hydrocarbon as a main component. To fully utilize its dissolving capacity, it is preferable to use a solvent having a boiling point range of about 180° to about 360° C., and particularly more preferable to use a solvent having a relatively wide and continued range of boiling points. In the case of a solvent having a narrow boiling point range, the stamping material becomes porous during calcination, thus deteriorating the physical properties of the stamped product.

Aromatic hydrocarbons capable of satisfying the foregoing conditions are those of two or three aromatic rings such as naphthalene and anthracene.

A single aromatic hydrocarbon component has only a single and definite boiling point, and thus a mixture of several components is preferable, and can further contain aromatic hydrocarbons of single aromatic ring or four or more aromatic rings or aliphatic hydrocarbons, or the like in such a range as not to deteriorate the capacity to dissolve the binder. Thus, a mixture of several kinds of single compounds can be used, but specifically an intermediate fraction having a boiling point range of 180° to 360° C. freed from a light oil fraction and a pitch residue obtained by the distillation of coal tar can be mentioned. This is also obtainable economically at a low cost. This fraction can be usually separated into middle oil, heavy oil and anthracene oil, but any of these oils or a mixture of at lest two of these oils, or those derived from these oils, for example, naphthalene oil, creosote oil, etc. can be utilized.

It is necessary to adjust the amount of the solvent so that the stamping material cannot be stamped at room temperature, but can be stamped at a temperature of 50° to 100° C., preferably 60° to 80° C., though the specific amount of the solvent greatly depends upon the kind and grain size of carbon aggregate in the stamping material, and the kind of binder and solvent. Generally, the change in the specific amount of the solvent by these factors has such a tendency that use of a relatively porous carbon aggregate such as artificial graphite, coke, etc., use of a carbon aggregate with a smaller grain size, use of a binder with a higher softening point, and use of a solvent with a higher boiling point require a large amount of a solvent for obtaining the equal stamping temperature, as compared with use of an aggregate with a higher compactness such as calcined anthracite, etc., use of an aggregate with a large grain size, use of a binder with a lower softening point, and use of a solvent with a lower boiling point.

Thus, it is generally difficult to numerically specify the amount of a solvent, but it is appropriate to select the amount of a solvent from a range of about 0.2 to about 5.0% by weight on the basis of a total of carbon aggregate and binder in view of the kind and grain size of carbon aggregate, and the kind of binder and solvent. A more preferable amount of a solvent can be confirmed by a simple preliminary test. For example, when calcined anthracite having grain sizes consisting of 73% by weight of 8-mesh passthrough grains, 50% by weight of 28-mesh passthrough grains and 26% by weight of 100-mesh passthrough grains according to the Tyler sieve test as a carbon aggregate, a pitch having a softening point of 40° to 45° C. according to the mercury method as a binder, and an oil fraction fractionated at 180° to 250° C. from coal tar by distillation (middle oil) as a solvent are used, a stamping material having an optimum packing density at a stamping temperature of 50° to 100° C. can be obtained by adding 0.2 to 1.6% by weight of the solvent on the basis of the total of a mixture consisting of 87% by weight of the carbon aggregate and 13% by weight of the binder (Case A). When a mixture of 80% by weight of artificial graphite and 20% by weight of pitch coke having grain sizes consisting of 90% by weight of 8-mesh passthrough grains, 70% by weight of 28-mesh passthrough grains, and 52% by weight of 100-mesh passthrough grains according to the Tyler sieve test as a carbon aggregate, a pitch having a softening point of 50° to 55° C. according to the mercury method, and an oil fraction fractionated at 250° to 360° C. from coal tar by distillation (heavy anthracene oil) as a solvent are used, a stamping material having an optimum packing density at a stamping temperature of 50° to 100° C. can be obtained by adding 2.2 to 4.0% by weight of the solvent to the total of a mixture consisting of 82% by weight of the carbon aggregate and 18% by weight of the binder (case B).

The stamping temperature is lowered correspondingly with increasing amount of a solvent, and thus a stamping material applicable at room temperature can be prepared, but the physical properties of calcined product obtained from the stamping material are considerably deteriorated owing to too large an amount of the solvent, and thus the stamping material applicable at room temperature is not suitable. In order to obtain a stamping temperature of about 25° C., for example, the solvent amounts to about 5% by weight on the basis of the total of carbon aggregate and binder in said case A and about 15% by weight in said case B. Thus, the amount of the solvent can be reduced and no deterioration of physical properties is brought about by adjusting the stamping temperature to 50° to 100° C. Furthermore, the stamping material can be solidified with less damage such as deformation, etc. only by leaving the material standing for cooling after the end of stamping because the stamping is carried out at a little higher temperature than the room temperature.

As a result of the addition of a solvent, the amount of a binder can be a little reduced within the range of the amount of solvent to be added in the present invention, as compared with the conventional stamping material consisting only of a carbon aggregate and a binder.

In the present invention, it is necessary in preparing said carbonaceous stamping material to prepare a mixture of a carbon aggregate and a binder capable of being stamped at a temperature about 100° C., preferably at the same temperature of 120° to 160° C. as that of the conventional stamping material by mixing the carbon aggregate with the binder in advance, and also to prepare a solvent separately, and mix the mixture with the solvent before a stamping operation to prepare a stamping material capable of being stamped at a temperature of 50° to 100° C. As the mixture of a carbon aggregate and a binder, it is most preferable to use the conventional stamping material prepared to be stamped at a temperature of 120° to 160° C. as such. For example, the mixture for the conventional stamping material is a mixture obtained by thoroughly mixing a carbon aggregate with a binder at a temperature of about 120° to about 160° C. until they are uniformly mixed with each other. When the stamping material obtained by further adding a solvent to said mixture in the course of the mixing is compared with the present stamping material obtained by adding a solvent to the mixture of a carbon aggregate and a binder at the stage of application, the former stamping material needs much more heating to a higher stamping temperature, for example, by 5° to 30° C. than the present invention, so long as the amount of added solvent is equal in each case, and the former stamping material needs a larger amount of a solvent, for example, by 0.3 to 1.0% by weight, on the basis of the total of the carbon aggregate and the binder to make the stamping temperature equal to each other. In order to make a stamping temperature as low as possible while keeping the amount of a solvent as small as possible, it is essential to add a solvent to a mixture of a carbon aggregate and a binder prepared in advance, at the stage of application.

When these three components are mixed together from the beginning, the resulting mixture is almost solidified and agglomerated by leaving it standing, and the agglomerated mixture must be disintegrated before the application. When a mixture of a carbon aggregate and a binder is separated from a solvent on the other hand, the mixture can keep a powdery or granular state up to a high temperature, and thus fear of solidification or agglomeration can be eliminated.

According to the present method for lining an aluminum electrolytic cell, a mixture of a carbon aggregate and a binder is prepared separately from a solvent, and the mixture and the solvent are mixed together just before the application to prepare a stamping material, and the resulting stamping material is applied to parts to be stamped at a temperature of 50° to 100° C., as described above. After the stamping, the stamped product is usually left standing for cooling as such, and after other preparatory working for startup has been completed, it is heated approximately to an operating temperature and calcined.

The amount of pitch fumes generated at the stamping is reduced to less than 50% of that of the conventional stamping material consisting of a carbon aggregate and a binder to be stamped at a temperature of 120° to 160° C., or reduced to about 2 to about 25% thereof under more preferable conditions, though it depends upon the kind of carbon aggregate, binder and solvent to be used. Furthermore, a lower stamping temperature can be employed in the present invention, and thus the generation of hot vapors can be also reduced. The working environment for the stamping can be greatly improved in this manner in the present invention. Furthermore, the physical properties are not substantially deteriorated even by calcination after the stamping, and thus quite a satisfactory cathode part can be built in the aluminum electrolytic cell.

The present invention will be described in detail below, referring to examples, which will not be restrictive of the present invention.

EXAMPLE 1

A mixture consisting of 87% by weight of a carbon aggregate and 13% by weight of a binder was prepared (Sample 1). The carbon aggregate was calcined anthracite, and had grain sizes consisting of 73% by weight of 8-mesh passthrough grains, 50% by weight of 28-mesh passthrough grains, and 26% by weight of 100-mesh passthrough grains according to the Tyler sieve test. The binder was a pitch having a softening point of 43° C. according to the mercury method. Sample 1 was a mixture prepared by heating the carbon aggregate at a temperature of 100° C., adding the binder thereto, and further heating the resulting mixture at 135° C., followed by thorough mixing and cooling. The mixture had a good stamping ability at 135° to 140° C.

On the other hand, a stamping material according to the present invention was prepared by adding a solvent to the mixture of Sample 1 (Sample 2). As the solvent, an oil fraction fractionated at 180° to 250° C. from coal tar by distillation (middle oil) was used in an amount of 0.8% by weight on the basis of the mixture of Sample 1. Sample 2 was a mixture prepared by heating the mixture of Sample 1 at 65° C., and adding the solvent thereto, followed by mixing at that temperature for 20 minutes, and was used in the following test at that temperature without cooling. The stamping material of Sample 2 had a good stamping ability at 60° to 70° C.

Furthermore, a stamping material applicable at room temperature was prepared by adding a much larger amount of the solvent to the mixture of Sample 1 (Sample 3). That is, Sample 3 was a mixture prepared by adding 5% by weight of the solvent to the mixture of Sample 1 at room temperature (25° C.) on the basis of the total of the mixture of Sample 1, followed by mixing. The stamping material of Sample 3 had a good stamping ability at about 25° C.

Said three kinds of Samples were pressmolded at the individual temperatures suitable for obtaining a good stamping ability for the individual Samples under a pressure of 500 kg/cm$^2$, and the apparent specific gravity of the resulting molded products was measured.

Furthermore, the individual molded Samples were heated to 950° C. at a temperature elevation rate of about 80° C./hr, and calcined at 950° C. for 3 hours. Apparent specific gravity, and compressive strength, of the resulting calcined Samples, and calcination loss were measured. Results are shown in Table 1.

TABLE 1

| Sample No. | | Sample 1 | Sample 2 | Sample 3 |
| --- | --- | --- | --- | --- |
| Stamping temperature (°C.) | | 135–140 | 60–70 | 25 |
| Molded product | Apparent specific gravity | 1.58 | 1.60 | 1.57 |
| Calcined product | Apparent specific gravity | 1.49 | 1.48 | 1.39 |
| | Compressive strength (kg/cm$^2$) | 330 | 310 | 190 |
| Calcination loss (wt %) | | 8 | 9 | 13 |
| Remarks | | Comparative Example | Invention | Comparative Example |

As is evident from Table 1, the stamping material of Sample 2 according to the present invention has no substantial deterioration in physical properties of the calcined product, as compared with the conventional stamping material of Sample 1 of high temperature stamping type consisting of the carbon aggregate and the binder, whereas the stamping material of Sample 3 containing a much larger amount of the solvent so as to enable the stamping at room temperature has a considerable deterioration in physical properties of the calcined product. This seems to be due to the fact that a large amount of the solvent is vaporized at the calcining stage, making the calcined product porous, as supported by the fact that the calcination loss of Sample 3 is high. Furthermore, the material corresponding to the calcination loss goes off as a gas to the surrounding atmosphere, and thus the envoronment must be made worse at the calcining stage of Sample 3.

The amount of pitch fumes generated by stamping said three kinds of Samples at the individual temperatures suitable for obtaining a good stamping ability for the individual Samples was measured, and it was fond that, when the amount of pitch fumes generated from Sample 1 was deemed to be 100, that from Sample 2 was 5 to 7, and that from Sample 3 was 2 to 4. That is, it is confirmed that the working environment was greatly improved at the stamping according to the present invention.

EXAMPLE 2

A carbon aggregate consisting of 20% by weight by artificial graphite and 80% by weight of pitch coke and having grain sizes consisting of 90% by weight of 8-mesh passthrough grains, 70% by weight of 28-mesh passthrough grains, and 50% by weight of 100-mesh passthrough grains according to the Tyler sieve test, a binder consisting of pitch having a softening point of 52° C. according to the mercury method, and a solvent consisting of an oil fraction fractionated at 250° to 360° C. from coal tar by distillation (heavy anthracene oil) were prepared separately.

First of all, a mixture consisting of 82% by weight of the carbon aggregate and 18% by weight of the binder was prepared (Sample 4). That is, Sample 4 was a mixture prepared by heating the carbon aggregate at 100° C., adding the binder thereto, and subjecting the mixture to sufficient kneading while further heating it to 145° C., followed by cooling. The mixture had a good stamping ability at 145° to 150° C.

Stamping materials containing 2.7% by weight of the solvent on the basis of the mixture of Sample 4 were prepared (Samples 5 and 6). Sample 5 was a mixture prepared by preheating the carbon aggregate at 75° C., and adding the binder and the solvent thereto at the same time, followed by mixing at that temperature for 20 minutes and then by cooling. The mixture of Sample 5 had a good stamping ability at 90° to 100° C. Sample 6 was prepared by adding the solvent to the mixture of Sample 4, followed by mixing at 75° C. for 20 minutes, and used in the following test at that temperature without cooling. Sample 6 had a good stamping ability at 70° to 80° C.

Said three kinds of Samples were press-molded at the individual temperatures suitable for obtaining a good stamping ability for the individual Samples under a pressure of 500 kg/cm$^2$, and the apparent specific gravity of the resulting molded products was measured.

Furthermore, the individual molded Samples were heated to 950° C. at a temperature elevation rate of about 80° C./hr, and calcined at 950° C. for 3 hours. Apparent specific gravity and compressive strength of the resulting Samples were measured. Results are shown in Table 2.

TABLE 2

| Sample No. | | Sample 4 | Sample 5 | Sample 6 |
|---|---|---|---|---|
| Stamping temperature (°C.) | | 145–150 | 90–100 | 70–80 |
| Molded product | Apparent specific gravity | 1.66 | 1.68 | 1.68 |
| Calcined product | Apparent specific gravity | 1.53 | 1.52 | 1.52 |
| | Compressive strength (kg/cm$^2$) | 390 | 370 | 365 |
| Remark | | Comparative Example | Comparative Example | Invention |

As is evident from Table 2, the stamping material of Sample 6 according to the present invention has no substantial deterioration in physical properties of the calcined product, as compared with the conventional stamping material of Sample 4 of high temperature stamping type consisting of the carbon aggregate and the binder. In comparison of Sample 5 with Sample 6, it is seen that the case of adding the solvent to a mixture of the carbon aggregate with the binder prepared in advance, before the application (Sample 6) can reduce the stamping temperature by about 20° C., as compared with the case of mixing the three components from the beginning (Sample 5).

Said three kinds of Samples were further applied to the lining of an aluminum electrolytic cell at the individual temperatures suitable for obtaining a good stamping ability for the individual Samples, and the amount of pitch fumes generated in the stamping was measured. It was found that, when the amount of pitch fumes generated from Sample 4 was deemed to be 100, that from Sample 5 was 9 to 15, and that from Sample 6 was 5 to 7.

The aluminum electrolytic cell thus lined has been on a continuous stream in a satisfactory state for about 6 months after the start-up of the cell, and there is no significant difference in operating results.

EXAMPLE 3

A mixture consisting of 89% by weight of the same carbon aggregate and 11% by weight of the same binder as used in Example 1 was prepared, and admixed with 2.0% by weight of the same solvent as used in Example 2 on the basis of the total of the mixture, and further mixed at 75° C. for 20 minutes. The resulting stamping material had a good stamping ability at 70° to 80° C., and was applied to the lining of an aluminum electrolytic cell at that temperature. The amount of pitch fumes generated at the stamping was 7 to 10, when that from Sample 1 of Example 1 was deemed to be 100. The aluminum electrolytic cell has been on a continuous stream in a satisfactory state after the start-up of the cell.

As is evident from the foregoing Examples, a working environment, which has been so far a great problem in the stamping working, can be satisfactorily improved according to the present invention, and also an aluminum electrolytic cell can be lined without any deterioration in the physical properties of the stamping material itself.

What is claimed is:

1. A method for lining an aluminum electrolytic cell by filling a carbonaceous stamping material consisting substantially of a carbon aggregate, a binder and a solvent for the binder containing aromatic hydrocarbons as a main component into parts to be stamped in the aluminum electrolytic cell and stamping the filled stamping material, thereby effecting a lining of the electrolytic cell, consisting essentially of (1) preparing a mixture consisting essentially of a carbon aggregate and a binder and being capable of being stamped at a temperature above 100° C., (2) preparing a solvent for the binder containing aromatic hydrocarbon as a main component in an amount insufficient to effect stamping of the stamping material at room temperature, but sufficient to effect stamping at a temperature of 50° to 100° C. when added to the mixture of aggregate and binder, (3) mixing said mixture with the solvent before application, thereby preparing a carbonaceous stamping material, and (4) applying the carbonaceous stamping material to parts to be stamped at a temperature of 50° to 100° C.

2. A method according to Claim 1, wherein the solvent has a boiling point range of 180° to 360° C.

3. A method according to claim 2, wherein the solvent is an intermediate fraction having a boiling point range of 180° to 360° C. obtained from coal tar by distillation.

4. A method according to any one of claims 1 to 3, wherein the solvent is used in an amount such that the stamping material is capable of being stamped at a temperature of 60° to 80° C.

5. A method according to any one of claims 1 to 3, wherein 0.2 to 5.0% by weight of the solvent is used on the basis of the total of the mixture of the carbon aggregate and the binder.

* * * * *